UNITED STATES PATENT OFFICE.

EDWARD FRANKFORD, OF LOCKPORT TOWNSHIP, WILL COUNTY, ILLINOIS.

OINTMENT.

SPECIFICATION forming part of Letters Patent No. 237,736, dated February 15, 1881.

Application filed November 18, 1880. (Specimens.)

*To all whom it may concern:*

Be it known that I, EDWARD FRANKFORD, of the township of Lockport, in the county of Will and State of Illinois, have invented a new and useful Compound called "Ointment," which compound is fully described in the following specification.

My invention relates to that class of compounds used to alleviate pain arising from cuts, burns, bruises, contusions, sprains, and diseases of the throat and lungs, and is useful for man or beast.

To prepare my ointment, take one pound of mutton-tallow or unsalted butter; to this add one and one-half pound of strained honey, one pound of resin, one-half pound of gum pitch, (white-pine resin,) one-half pound of beeswax, one ounce of spirits of turpentine, one ounce of oil of cumin, one ounce of oil of rhodium, one ounce of oil of cedar, one ounce of oil of hemlock, one ounce of balsam of fir, and one ounce of tincture of cantharides. Let the compound simmer over a slow fire until the whole can be thoroughly mixed. Then let it harden in a cool place, and it becomes immediately ready for use. This compound or ointment does not decompose with age; but, on the contrary, age increases its value.

Having thus described my invention, what I claim is—

An ointment compounded of mutton-tallow or unsalted butter, resin, gum pitch, (white-pine resin,) honey, beeswax, spirits of turpentine, oil of cumin, oil of rhodium, oil of cedar, oil of hemlock, balsam of fir, and tincture of cantharides, in substantially the proportions above stated.

EDWARD FRANKFORD. [L. S.]

In presence of—
J. T. FREEMAN,
EDWD. FERRELL.